United States Patent Office 3,256,151
Patented June 14, 1966

3,256,151
PROCESS FOR PREPARING CALCITONIN
Douglas Harold Copp and Robert Laing Noble, Vancouver, British Columbia, Canada, assignors to Canadian Patents and Development Limited, Ottawa, Ontario, Canada, a Canadian company
No Drawing. Filed May 11, 1962, Ser. No. 194,164
7 Claims. (Cl. 167—74)

This invention relates to a new physiologically active substance. More specifically, this invention relates to compositions comprising calcitonin substantially free of parathormone and to processes for the production of such compositions.

In the past it has been known that the parathyroid gland was in some way responsible for the maintenance of the calcium level in plasma, especially in blood plasma. A hormone, parathormone, has been described in the literature as having the property of increasing the calcium level, probably by removal of calcium from the bone structure. It was generally believed that the control of high blood calcium levels depended on the suppression of the parathormone level, although there has been speculation that a second factor might possibly be present, functioning to demobilize plasma calcium into the bones.

We have now demonstrated that a second factor, having the power to lower plasma calcium levels, does indeed exist. We have further found that this factor, to which we give the name calcitonin, can be isolated in a form free of the counterbalancing parathormone and thus afford a highly useful therapeutic tool. Many drugs, e.g., the corticoid steroids, have a side effect of slowly removing calcium from bones to cause osteoporosis. There is thus a great need for a method of therapy to correct this undesirable side effect and the compositions of this invention, comprising calcitonin substantially free of the counterbalancing parathormone, afford this possibility of just such therapy.

The processes for the preparation of the compositions of this invention form an additional aspect of this invention. We have found several methods for preparing such compositions. One such is the extraction of fresh parathyroid tissue with water at a pH of 6.7 to 7.5. The parathyroid tissue can be from any suitable source, usually bovine or canine. Conveniently, it is in the form of thin slices, although it may be chopped or otherwise finely subdivided. Too fine a subdivision makes separation from the extract difficult while lack of subdivision decreases the penetration of tissue. Since the parathormone requires acid to free it from the tissues it remains behind and the neutral extract comprises calcitonin substantially free of parathormone. In order to get the best results, preferably a maximum of three volumes of water per volume of tissue should be used, since larger amounts of extractant dilute the active principal. More concentrated extracts are obtained by use of lower quantities of water or even by compression of the tissues to collect the plasma therefrom. The temperature of such extraction may vary from 5° C. up to about room temperature with lower temperatures preferred. The stability of such extracts is illustrated by the fact that they may be boiled in order to precipitate protein by products without destroying the active principal.

The active principal can be precipitated by adjusting the pH to 5.5 to 6.5 with acid, preferably 0.1 N HCl. The pH used should be that at which sharp precipitation occurs. The precipitated active material (isolated by filtration or centrifugation) can readily be dissolved in water at neutral pH. Further purification can be effected by dialysis through a cellophane membrane and by dilution with alcohol (to at least 60% alcohol) which precipitates more protein impurities. Such alcohol solutions, upon dilution with 2 to 4 volumes of ether, precipitate the active principal in much purer form.

The procedure described above is an extraction of the calcitonin present in parathyroid tissue. Even more desirable is a process of biosynthesis of calcitonin by using parathyroid tissue and a physiologically compatible fluid high in calcium. Such a fluid causes the tissue to make more calcitonin and the extract thus formed is much higher in this active principal than is a simple extract of the tissue with neutral pH water.

One such method is the perfusion of isolated thyroid-parathyroid glands in live dogs with blood high in added calcium followed by centrifugation of the blood to give the plasma containing the calcitonin activity. Similar to this is the agitation of sliced fresh parathyroid gland tissue with blood or other physiologically acceptable fluids containing added calcium. In either case the added calcium is above and beyond the 10 mg. calcium ion per 100 cc. normally found in plasma. Only 3 to 5 mg. percent should be added since more causes toxic effects on the tissue or even on the whole animal. The physiologically acceptable fluids include, besides whole blood, palsma, culture media and isotonic saline solutions. In either case, the added calcium causes the parathyroid tissue to manufacture more calcitonin while keeping parathormone bound in the tissues and the extract contains the calcitonin activity free of any parathormone activity. By using the same method but using fluids equivalently low in calcium (5 to 8 mg. percent) the tissues can similarly be induced to manufacture parathormone free of calcitonin.

The compositions of this invention retain their activity for up to 10 days when refrigerated. Activity is tested, as shown in the examples below, by injection into a fasted dog. The calcium level must fall at least 0.3 mg. percent in the ensuing 20 to 30 minutes. Ordinarily, the effect lasts about an hour and by the end of that time the calcium level is normal. If parathormone is present, its much slower effect then shows up, resulting in an increase in blood calcium above normal after the hour is past.

Such a test requires a very accurate blood calcium analytic method, which we have devised, as described in the examples.

The dosage of calcitonin necessary to produce a minimum of 0.3 mg. percent lowering of plasma calcium is about 5 mg./kg. of body weight of the active precipitate (about 1 g.,) produced by neutral water extraction (300 cc.) of 100 g. of fresh beef parathyroid tissue, after boiling, precipitation with acid and redissolving in neutral solution.

The invention can be illustrated by the following examples:

*Example 1*

Whole frozen beef parathyroid glands are thawed and finely subdivided. 100 grams of the product is treated with 100 cc. of distilled water of neutral pH at a temperature of about 10° C. The water extract is pressed out of the powdered gland material and the same extraction repeated twice more. Desirably this extraction is done continuously by recycling the 300 cc. of water through the subdivided gland.

The extracts are combined, raised to the boiling point and filtered (through coarse filter paper). The pH of the filtrate is adjusted with 0.1 N HCl to about pH 6— where the flocculation of a light precipitate occurs. This precipitate is filtered off and redissolved in 25 cc. of distilled $H_2O$—with the pH of the resulting solution being adjusted to neutral with a few drops of 0.1 N NaOH. This neutral solution is again filtered to separate an inactive residue. This filtrate contains about 1 g. (on a dried weight basis) of material with calcitonin activity.

In an assay dog, injection of this material in a dose of approximately 5 mg./kg. body weight produces a positive calcitonin response as defined under the method of assay, and is free of parathormone activity.

Further purification can be effected as follows: Four volumes of ethyl alcohol are added to one volume of the above final filtrate (or to give at least 60% alcohol). An inactive precipitate forms and is filtered off (precipitate inactive). Three volumes of ether are then added to one volume of the aqueous alcoholic solution and the active principal separates as a precipitate. This precipitate is filtered off (and washed with distilled water of pH 6.0).

This precipitate (about 0.7 g.) can be redissolved in distilled water neutral pH for use, and has high calcitonin activity. It is entirely free of parathormone activity.

The isolated, purified principal retains its calcitonin activity for about 10 days when refrigerated at about 4° C.

*Example 2*

100 ml. of freshly drawn blood from dog, human or other species is rendered incoagulable by addition of 0.5 ml. percent heparin, and 1–2 mg. of calcium as calcium chloride or calcium gluconate is added to raise the plasma calcium level to 12–14 mg. percent. 20 ml. of this blood is transferred to a large test tube, which is placed in a water bath at 37° C. The blood is gently agitated and oxygenated by gently bubbling oxygen through it. Parathyroid glands from dog, beef or other suitable source are removed quickly and cut with a razor in slices 1–3 mm. thick. These are transferred within 5 minutes into the high calcium blood and incubated with this blood for 1–2 hours. The calcitonin activity is found in the plasma, which is separated from the cells by centrifugation. The yield from 10–20 mg. dog parathyroid tissue is equivalent to that obtained from several grams of fresh beef parathyroids.

The same procedure may be used to produce parathormone, instead of adding calcium to the blood, an amount of EDTA equivalent to 1–2 mg. calcium is added per 100 ml. of whole blood, to lower the plasma calcium level 2–4 mg. percent (to 6–8 mg percent).

*Example 3*

A dog is fasted overnight and anesthetized with Nembutal. The thyroid-parathyroid glands are exposed surgically, and the muscular branches of the superior thyroid artery are ligated and cut. A 100 ml. sample of arterial blood is drawn and 0.5 ml. 1% heparin is added to prevent coagulation. To this, 1–2 mg. calcium is added as calcium chloride or calcium gluconate, to raise the plasma calcium level 2–4 mg. percent. The blood is circulated through plastic tubing by a variable speed perfusion pump (Sigmamotor Co., Model TM–11) to a cannula which is inserted into the carotid artery below the exit of the superior thyroid artery and pointed towards it. The carotid artery is now tied and cut above the exit of the superior thyroid artery and all branches of the latter other than those to the thyroid and parathyroid glands are ligated and cut. The glands are removed from the body and placed in a perfusion chamber with a warm water jacket (37° C.). The blood issuing from the cut veins is collected and returned to the reservoir continuously, and is oxygenated by bubbling oxygen gently through it. The perfusion is carried out for an hour, and the plasma, which contains the calcitonin activity is then separated by centrifugation. Activity is unchanged after storage in a refrigerator.

The same method may be used for preparing parathormone if, instead of adding calcium to the blood in the reservoir, an amount of EDTA sufficient to chelate 1–2 mg. of calcium is added to the 100 ml. of blood in the reservoir, thus lowering the level of non-EDTA bound calcium to 6–8 mg. percent.

*Example 4.—Method for precise determination of plasma calcium concentration*

The assay for calcitonin depends upon a very precise determination of the plasma calcium concentration. This is accomplished by a semiautomatic modification of the method of Fales (J. Biol. Chem., 204:577, 1953) and gives a reproducibility of better than 0.2% on 0.2 ml. samples containing 10–20 mg. of calcium. The method consists of a photometric titration of calcium with EDTA using ammonium purpurate as indicator. The 0.2 ml. sample is transferred with a precision micro-pipette to 5 ml. of distilled water in a Klett-Summerson colorimeter tube, and 1 drop of 50% saturated NaOH and 3 drops of 0.1% ammonium purpurate solution are added. The tube is placed in a Klett-Summerson colorimeter with a 500 lambda second order interference filter. The colorimeter is modified so that the output of which normally activates the galvanometer is diverted to a millivolt potentiometric recorder (Sargent Model SR 3 Recorder with 1 mv. range plug, or Beckman Laboratory Potentiometric Recorder #93500) with a constant speed drive of 1 inch per minute. A stirrer is used to mix the solutions in the tube. 0.02% EDTA (disodium ethylene-diamine tetraacetate) is added from a constant delivery rate syringe burette (Harvard Instrument Co. #1100 Portable Infusion Withdrawal Pump with 8 r.p.m. motor and 10 ml. syringe). The potentiometric recorder and syringe burette are switched on simultaneously, and a record is obtained of the increasing light transmittance and potential as the calcium is titrated. At the end point, there is a sharp break in the titration curve. The distance from start to end point is measured on the chart and is directly proportional to the calcium present in the sample.

*Example 5.—Assay for calcitonin activity*

The assay animal of choice is the fasted dog, because of the stability of the plasma calcium level in this animal. The animal is maintained on a low calcium diet (0.04% Ca.) for at least 4 days before use. The dog is fasted overnight, anesthetized with Nembutal, and blood samples are collected at 15 minute intervals for a control period of 1 hour. The plasma calcium values during this period should not vary by more than 0.05 mg. percent from the average for this control period.

The test material is injected intravenously, and blood samples are collected at 10, 20, 30, 45, 60, 90 and 120 minutes thereafter. Presence of calcitonin activity is indicated by a fall of at least 0.4 mg. percent 20 minutes after injection of the test material, and a return to within 0.1 mg. percent of the control plasma calcium level at 60 minutes. If the material is contaminated with parathormone, calcium level will be elevated at least 0.3 mg. percent above the control level in the 60 minutes sample, and will be still higher at 90 minutes.

In this specification where calcium is mentioned as in solution, calcium ion is intended.

We claim:

1. A process of obtaining calcitonin substantially free of parathormone from parathyroid glands which comprises the extraction of parathyroid tissue with water at a pH between 6.5 and 7.5 and lowering the pH below 6.5 until an active precipitate forms.

2. The process of claim 1 in which the aqueous extract so formed is purified by boiling to remove protein impurities which precipitate, and the filtrate therefrom is then adjusted to pH 5.5 to 6.5 to form a precipitate carrying the calcitonin activity.

3. The process of claim 2 in which said precipitate is then dissolved in water at pH 6.5–7.5 and ethanol is added to a minimum concentration of 60% alcohol to precipitate further inert impurities.

4. A process of preparing a composition comprising a blood calcium level regulating parathyroid hormone substantially free of the opposing blood calcium regulating parathyroid hormone which comprises perfusing live parathyroid tissue with a physiologically compatible fluid differing by 2 to 5 mg. of calcium ion per 100 ml. of said fluid from the 10 mg. per 100 ml. normal calcium plasma level, and separating said perfusing fluid from any solids.

5. The process of claim 4 in which the perfusing fluid contains 13 to 15 mg. of calcium per 100 ml. and the hormone composition so produced is calcitonin substantially free of parathormone.

6. The process of claim 4 in which the perfusing fluid is whole blood and the live parathyroid tissue is an isolated thyroid-parathyroid gland in a living animal.

7. The process of claim 6 in which the perfusing fluid is whole blood and the parathyroid tissue is freshly dissected from a living animal.

References Cited by the Examiner

Eastland: Biochem. J., vol. 26, 1932, pages 2123 to 2128.

JULIAN S. LEVITT, *Primary Examiner.*

FRANK CACCIAPAGLIA, Jr., *Examiner.*

SAM ROSEN, *Assistant Examiner.*